United States Patent
Beesley

Patent Number: 5,680,438
Date of Patent: Oct. 21, 1997

[54] TELECOMMUNICATIONS SYSTEM HAVING SINGLE BASE UNIT AND PLURAL INDIVIDUAL ANTENNAS EACH FOR COMMUNICATION WITH ONE OR MORE REMOTE HANDSETS FOR USE WITHIN PREMISES

[75] Inventor: Graham Edgar Beesley, Winchester, England

[73] Assignee: AT & T Wireless Communications Products, Ltd., Winchester, England

[21] Appl. No.: 360,663
[22] PCT Filed: Aug. 18, 1993
[86] PCT No.: PCT/GB93/01750
§ 371 Date: Dec. 22, 1994
§ 102(e) Date: Dec. 22, 1994
[87] PCT Pub. No.: WO94/05127
PCT Pub. Date: Mar. 3, 1994

[30] Foreign Application Priority Data

Aug. 18, 1992 [GB] United Kingdom ............... 9217524

[51] Int. Cl.$^6$ ............................................. H04Q 7/30
[52] U.S. Cl. ............................................. 379/58
[58] Field of Search ............................... 379/58, 56

[56] References Cited

U.S. PATENT DOCUMENTS

| | | | |
|---|---|---|---|
| 5,133,001 | 7/1992 | Bohm | 379/58 |
| 5,195,127 | 3/1993 | Ichikawa et al. | 379/58 |
| 5,381,459 | 1/1995 | Lappington | 379/56 |

*Primary Examiner*—William Cumming
*Attorney, Agent, or Firm*—Wenderoth, Lind & Ponack

[57] ABSTRACT

A cordless telephone system is of the type including a plurality of telephone handsets communicating by two-way radio with a base unit connected to the public telephone network. In the larger premises, normally a plurality of spaced base units are employed, so that the handsets can communicate with the most favorably-positioned base unit wherever they are on the premises. In the present invention, however, larger premises are covered by just a single base unit, including within it all the necessary transceivers together with a plurality of transponders which are connected to the base unit and each other by means of an RF cable. The transponders each have aerials by which they can communicate by two-way radio with the handsets. The transponders downconvert the RF frequency of the radio link to a lower IF frequency which is passed to the transceivers via the cable. The transponders can be distributed about the premises as needed to provide complete radio coverage.

16 Claims, 1 Drawing Sheet

1

TELECOMMUNICATIONS SYSTEM HAVING SINGLE BASE UNIT AND PLURAL INDIVIDUAL ANTENNAS EACH FOR COMMUNICATION WITH ONE OR MORE REMOTE HANDSETS FOR USE WITHIN PREMISES

BACKGROUND OF THE INVENTION

1. Field of the Invention

This invention relates to a cordless telephone system.

2. Description of the Related Art

The basic cordless telephone system comprises a base unit which is hard wired to the public telephone (PSTN or ISDN) network together with one or more handsets which are linked to the base unit by means of a two-way radio link. To this end, each handset includes a transceiver and a keyboard with associated circuitry, and the base unit comprises one or more transceivers, at least one for each handset, together with control and interface circuitry.

In order to cater for larger systems installed in physically larger premises, it is known to provide a plurality of base units distributed around the premises and all hard wired to a central control and interface unit at which the connections to the external telephone network are made. The maximum capacity of each base unit in such a system is defined by the number of transceivers which are installed in that base unit.

SUMMARY OF THE INVENTION

The present invention is concerned primarily with the larger systems which would ordinarily require multiple base units, as described above. In the present invention, instead of a plurality of base units each having a number of transceivers, the system comprises just one base unit, which includes all the necessary transceivers, together with the usual control and interface circuitry, and is characterised by further comprising a plurality of RF input/output "heads" which communicate with the individual handsets on the system, and pass signals to and from the handsets by radio communication. The RF heads will be distributed about the premises in the same manner as the base units would have been, and are linked to each other and to the base unit by means of a hard-wired RF connection, such as coaxial cable.

Preferably the RF heads will be non-intelligent, and will simply convert signals from hard-wired form to radio form, probably with a change of frequency involved. In the preferred embodiment of the invention, each RF head comprises a respective transponder which acts as a wideband converter of signals to and from the RF connection. Preferably the incoming signal is converted to a different frequency unique to that particular transponder so that the signals from all the transponders may be carried simultaneously by the RF cable connection, separated by frequency. The exact frequencies involved vary but, as an example, the cordless telephone (CT) band in the UK is from 864.1 to 868.1 MHz, and forty channels are defined within this 4 MHz band. Preferably the transponders will have a bandwidth sufficient to cover this full 4 MHz and will normally downconvert the radio signals to an IF frequency suitable for transmission along the RF cable. This IF frequency will be unique to the transponder: for example a first transponder might downconvert to an IF band of 100 to 104 MHz, a second to an IF band of 105 to 109 MHz, a third to an IF band of 110 to 114 MHz, and so on. Note that 1MHz has been left between the IF bands to act as a guard band.

In the base unit itself, each of the transceivers is capable of receiving any single channel from any of the RF heads. The transceiver is tuned to the channel in any of the IF bands corresponding to an RF head. The transceiver may therefore select the reception of the same CT channel on different transponders to establish the best reception of a particular CT for example or may tune sequentially to all the CT channels on a particular transponder to establish the activity level in the CT band and repeat this on the other transponders. In this way a single transceiver can be made to scan all the channels on all the transponders. Normally this duty would be carried out by a plurality of transceivers to provide a reasonable service level and traffic capacity.

In an embodiment, the transceivers and/or transponders may be made frequency agile, able to change their tuned IF frequency, under the control of the control circuitry, according to the requirements of the system.

BRIEF DESCRIPTION OF THE DRAWINGS

In an order that the invention may be better understood, an embodiment thereof will now be described by way of example only and with reference to the accompanying drawing which is a block diagram showing an embodiment of the invention.

DETAILED DESCRIPTION OF THE PREFERRED EMBODIMENTS

Figure 1:
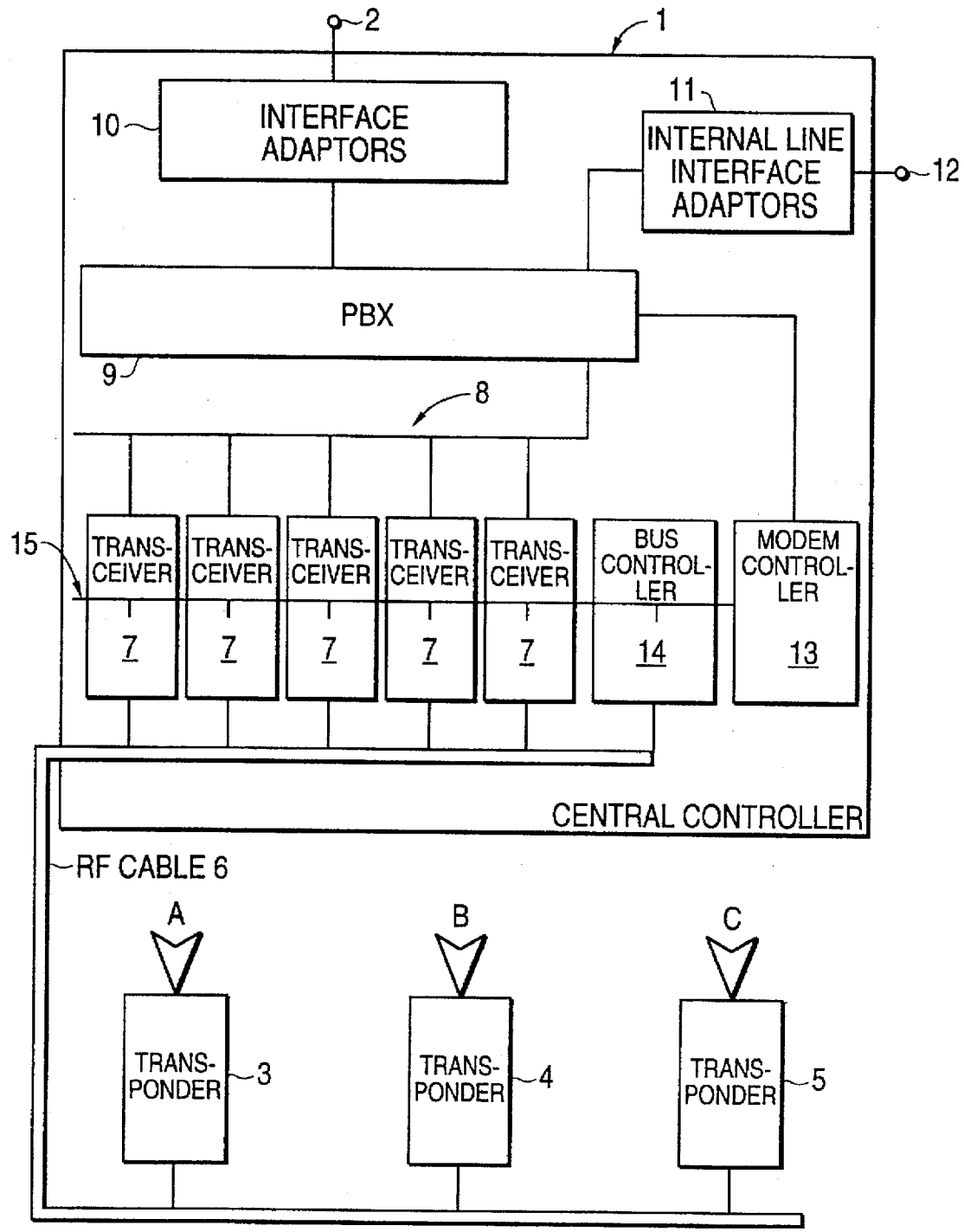

Referring to the drawing, the system comprises a base unit which includes a central Controller 1, connected at a hard-wired terminal 2 to the public telephone network, and a plurality of transponders, three of which are shown under references 3, 4 and 5. The exact number of transponders will be dictated by the size and layout of the premises being covered. All of the transponders are linked to each other, and to the central controller 1 by means of an RF cable 6, for example a coaxial cable.

Each transponder has an aerial (not shown) by which it communicates by two-way radio, represented by the arrows A, B and C, with one of a plurality of cordless telephone handsets (not shown). As is well known, each of these handsets comprises a telephone keypad, together with control circuitry, and a transceiver for communicating with the transponders. The handsets are generally portable, and may therefore be found anywhere within the premises, and possibly, within a limited range, outside it.

Each handset transceiver can communicate on any one of the channels within the allocated CT band, and-which channel is used for a particular link will depend upon the availability of channels at the time at which the link commences. When a link is being set up, the transmission from the handset will often be received by several transponders 3,4,5. One or more of the transceivers 7 will tune to the same CT channel on different transponder IFs and estimate the best reception of the handsets transmission. The link will then be established via the most advantageous transponder.

The cable 6 connects the transponders to the central controller 1 and in particular to a plurality of transceivers 7. Each transceiver 7 typically comprises a combined FSK transmitter/superheterodyne receiver which, on receive, takes a signal at a particular channel frequency from the cable 6, demodulates the signal and converts it to a format, such as pulse code modulated (PCM), suitable for application to the telephone network. All the outputs of the transceivers are passed to a serial PCM bus 8 for application to a bus structured PBX 9 and thence to terminal 2 via interface adaptors 10. An internal line facility may be provided from the PBX via internal line interface adaptors 11 to a terminal 12.

On transmit, the transceivers do the opposite, namely FSK modulate the PCM signals from line 8 onto an RF signal for onward application to the RF cable 6 and thence via one of the transponders 3, 4 or 5 and its radio link to the appropriate handset.

Various strategies are used for combining the transmission and reception over a single channel. In CT2, transmission and reception is by TDD (time division duplex) in which transmission and reception take place alternately in bursts. This is carried out in the transceivers 7, under the control of a modem controller 13 via a modem control bus 15. Also connected to the cable 6, and under the control of the modem controller 13 via bus 15 is a channel scanner/RF bus controller 14.

As already mentioned, the radio link in a cordless telephone system is carried out over a single channel, being one of a plurality of channels within allocated frequency limits. In the UK, forty discrete channels are allocated, all in a 4 MHz frequency range between 864.1 and 868.1 MHz. The capacity of any system is thus forty simultaneous radio links between the handsets and the base unit. Any one handset can communicate on any one of the available channels (not all forty channels may be available in any one system) with any one of the transponders 3, 4 or 5 on the system. The decision as to which particular channel is used, and which particular transponder is used for any one particular link is determined by a predetermined protocol, details of which do not form part of the present invention.

The transponders are sited around the premises so as to give overlapping radio coverage and the number required is thus determined by the area of the premises to be covered. All the transponders are tuned to respond to the whole of the allocated CT bandwidth—i.e. in the case of the UK, at least from 864.1 to 868.1 MHz.

Each transponder down converts all signals in the entire CT band to an intermediate frequency (IF) unique to that transponder. For example transponder 3 might down convert to a frequency in the IF band 100 to 104 MHz, transponder 4 to a frequency in the IF band 105 to 109 MHz, transponder 5 to a frequency in the IF band 110 to 114 MHz, and so on. In this example, 1 MHz has been left between the IF bands to act as a guard band.

The IF signals are passed to RF cable 6 for transmission to the transceivers 7. The cable 6 may be carrying simultaneous signals from a number of the transponders, since these are uniquely separated from one another on a frequency basis.

Any signals which have been down converted by the transponders 3,4 or 5 can be detected by any one of the transceivers 7. The transceiver used to detect the signal will be one which is free at that moment.

Each transceiver 7, once the CT channel and transponder have been selected, demodulates a single 15 CT channel from the IF corresponding to the chosen transponder selected from the IFs from all the transponders which are available on the RF bus cable 6 and converts it to a signal suitable for the telephone network, which is output onto the bus 8, as described above. Any one transceiver 7 is able to access any one of the CT channels in any transponder IF band in the normal CT2 FDMA/TDD manner.

When in transmission mode, each transceiver 7 modulates the signal on bus 8 onto a carrier 25 corresponding to a channel within the IF band appropriate to that transceiver band, and transmits it, via RF cable 6, to the appropriate transponder 3, 4 or 5 for that particular IF band, in which the IF frequency is upconverted to the regular radio frequency for transmission to the handset.

In the usual protocol for single channel (duplex) operation, transmission and reception take place alternately in bursts, typically of 375 µS duration.

The fact that all transponders can communicate simultaneously on the same channel, under the control of the modem controller 13, means that seamless handover between transponders (handover without interruption) and spatial diversity (handsets moving about the premises during a link) can be achieved by switching transceiver to the same CT channel in the IF corresponding to the required transponder. The choice as to which transponder should be used should preferably be made by an independent transceiver (or receiver) 14. It should be noted that the transponders are unintelligent and simply respond to signals on the RF cable 6 within their IF band or convert the entire CT band to the IF frequency being used by a particular transponder and feed that onto the RF cable.

Diversity and seamless handover are achieved by switching signals between one transponder 3, 4 or 5 and another by switching between their corresponding IF bands under the control of controller 14. This can be achieved by the use of two transceivers 7 handling the same CT channel but in different transponder's IF bands. Alternatively the diversity/handover decision can be made by separately at IF or baseband and the frequency change if required from one IF CT channel to another IF and corresponding CT channel (and hence transponder) made on the active transceiver. The effectiveness of handover and diversity depend on the degree of coverage overlap between adjacent transponders. A considerable amount of overlap is required for the highest quality and this means that the system will not usually be using the same channel in an adjacent transponder. This gives a cellular like re-use scenario with for example a one sixth band occupancy maximum per transponder.

The frequency reference and transmit level control can be achieved by a pilot frequency reference sent down the RF bus cable 6 from controller 14. In addition, DC power, transmit enable and transponder set up control (selection of the required IF band during installation) can also be provided by this cable.

The above-described RF bus system provides a high capacity network with simple handover and diversity features. The cordless handsets communicate with the most appropriate transponder, the selection of this being under the control of the modem controller. The number of transceivers 7 determines the number of simultaneous communications that can be handled by one transponder (within the normal CT2 technology and spectrum allocation limits). Time delay is that of a basic CT2 system and is not degraded by signal processing. The system's large capacity is provided by one screened cable 6 running from the central controller to the transponders.

The invention claim is:

1. A telecommunications system comprising a portable portion, and a fixed portion;

said portable portion comprising a plurality of handsets, each one of the plurality of handsets comprising a telephone keyboard and a transceiver for communicating by two-way radio on any one of a plurality Of channels with the fixed portion;

said fixed portion comprising a base unit, and a plurality of transponders connected to the base unit by means of a hard-wired RF connection;

said base unit comprising a plurality of transceivers and connection means for connection to the public telephone network;

each one of said plurality of transponders having an aerial by which the transponder communicates using two-way radio with said handsets, and modulation means for converting two-way radio signals to IF signals which are lower frequency RF signals, said IF signals being passed to the base unit by means of said hard-wired RF connection;

wherein said telecommunications system is a premise-limited cordless telephone system for installation in a premises with said transponders physically separately from said base unit such that said transponders are distributed about the premises to give complete radio two-wave coverage of the premises;

wherein said modulation means of each transponder converts radio signals to and from an IF band which is different from IF bands of all other transponders, each of said transponders being uniquely identified at the base unit on the basis of the respective IF band of each transponder, the respective IF band being broad enough to carry said plurality of channels; and wherein each transceiver in said base unit includes means for selecting a channel from any one of said IF bands.

2. A system as claimed in claim 1, wherein each transceiver has means for converting said IF signal to a signal suitable for transmission on said telephone network, and for converting a signal receiver on said telephone network to said IF signal.

3. A system as claimed in claim 1, wherein each transceiver has means for selecting the channel within an IF band which is providing the best reception.

4. A system as claimed in claim 2, wherein each transceiver has means for selecting the channel within an IF band which is providing the best reception.

5. A system as claimed in claim 1, wherein each transceiver has means for scanning sequentially across the channels in each IF band.

6. A system as claimed in claim 2, wherein each transceiver has means for scanning sequentially across the channels in each IF band.

7. A system as claimed in claim 3, wherein each transceiver has means for scanning sequentially across the channels in each IF band.

8. A system as claimed in claim 4, wherein each transceiver has means for scanning sequentially across the channels in each IF band.

9. A system as claimed in claim 1, wherein at least one of the transceiver and the transponders are made frequency agile by incorporating means for selectively changing the IF frequency to which said at least one of the transceiver and the transponders are tuned.

10. A system as claimed in claim 2, wherein at least one of the transceiver and the transponders are made frequency agile by incorporating means for selectively changing the IF frequency to which said at least one of the transceiver and the transponders are tuned.

11. A system as claimed in claim 3, wherein at least one of the transceiver and the transponders are made frequency agile by incorporating means for selectively changing the IF frequency to which said at least one of the transceiver and the transponders are tuned.

12. A system as claimed in claim 4, wherein at least one of the transceiver and the transponders are made frequency agile by incorporating means for selectively changing the IF frequency to which said at least one of the transceiver and the transponders are tuned.

13. A system as claimed in claim 5, wherein at least one of the transceiver and the transponders are made frequency agile, by incorporating means for selectively changing the IF frequency to which said at least one of the transceiver and the transponders are tuned.

14. A system as claimed in claim 6, wherein at least one of the transceiver and the transponders are made frequency agile by incorporating means for selectively changing the IF frequency to which said at least one of the transceiver and the transponders are tuned.

15. A system as claimed in claim 7, wherein at least one of the transceiver and the transponders are made frequency agile by incorporating means for selectively changing the IF frequency to which said at least one of the transceiver and the transponders are tuned.

16. A system as claimed in claim 8, wherein at least one of the transceiver and the transponders are made frequency agile by incorporating means for selectively changing the IF frequency to which said at least one of the transceiver and the transponders are tuned.

* * * * *